United States Patent [19]
Osterloh

[11] Patent Number: 5,627,322
[45] Date of Patent: May 6, 1997

[54] MEASUREMENT SENSOR FOR A VORTEX FLOWMETER

[75] Inventor: Ingo Osterloh, Dessau, Germany

[73] Assignee: Bopp & Reuther Messtechnik GmbH, Mannheim, Germany

[21] Appl. No.: 457,530

[22] Filed: Jun. 1, 1995

[30] Foreign Application Priority Data

Nov. 21, 1994 [DE] Germany ................ 44 41 129

[51] Int. Cl.$^6$ .................................................. G01F 1/32
[52] U.S. Cl. ................................. 73/861.22; 73/861.21
[58] Field of Search ........................ 73/861.21, 861.22, 73/861.24, 861.25

[56] References Cited

U.S. PATENT DOCUMENTS

| | | | |
|---|---|---|---|
| 3,572,117 | 3/1971 | Rodely | 73/194 |
| 3,927,566 | 12/1975 | Zanker | 73/194 VS |
| 3,972,232 | 8/1976 | Miller et al. | 73/194 VS |
| 4,201,084 | 5/1980 | Ito et al. | 73/861.22 |
| 4,559,832 | 12/1985 | Burlage et al. | 73/861.24 |
| 4,625,564 | 12/1986 | Murakami et al. | 73/861.24 |
| 5,147,695 | 9/1992 | Colley et al. | 428/34.1 |
| 5,209,125 | 5/1993 | Kalinoski et al. | 73/861.24 |
| 5,447,073 | 9/1995 | Kalinoski | 73/861.22 |

FOREIGN PATENT DOCUMENTS

| | | |
|---|---|---|
| 0068920A2 | 1/1983 | European Pat. Off. . |
| 0100931B1 | 2/1984 | European Pat. Off. . |
| 0110321B1 | 6/1984 | European Pat. Off. . |
| 127531 | 9/1977 | German Dem. Rep. . |
| 201506 | 7/1983 | German Dem. Rep. . |
| 210972 | 6/1984 | German Dem. Rep. . |
| 1926798 | 12/1969 | Germany . |
| 2229583 | 1/1973 | Germany . |
| 2415583 | 11/1974 | Germany . |
| 2827985 | 5/1979 | Germany . |
| 4036869A1 | 5/1992 | Germany . |
| 406167368 | 6/1994 | Japan ................ 73/861.22 |
| 91/10114 | 7/1991 | WIPO . |

*Primary Examiner*—Richard Chilcot
*Assistant Examiner*—Max H. Noori
*Attorney, Agent, or Firm*—Milton Oliver

[57] ABSTRACT

The invention relates to a measurement sensor for a vortex flowmeter having a damming member, a scanning element disposed downstream of the damming member, and an electromechanical transducer associated with the scanning element and embedded therein, wherein a deformable compensating layer is provided at least in portions between the electromechanical transducer and the scanning element.

11 Claims, 1 Drawing Sheet

5,627,322

MEASUREMENT SENSOR FOR A VORTEX FLOWMETER

FIELD OF THE INVENTION

The invention relates to a measurement sensor for a vortex flowmeter having a damming member, a scanning element disposed downstream of the damming member, and an electromechanical transducer associated with the scanning element and embedded therein.

BACKGROUND

Such measurement sensors are known, for example, from German published application DE-OS 24 15 583 and East Germany Patent DD-PS 127531.

More particularly DD-PS 127531, which most closely resembles the invention, discloses a vortex flowmeter comprising a damming member which is disposed in a flowed-through pipe and whose downstream side bears a plate whose surface is provided with strain gauges.

Vortex flowmeters are also known in which piezoelectric sensors of flowing media are disposed insulated inside or outside the damming member.

The operation of the vortex flowmeter is based on the fact that when medium flows on to the damming member, vortices are alternately induced on both sides of its end face and that the vortices form the so-called Karman vortex trail. As they become detached the vortices skim past the rear side of the damming member, where they induce alternating pressure loadings whose frequency depends on the flow velocity of the medium to be determined.

The prior art vortex flowmeters have the problem that it has proved impossible to obtain a construction resistant to temperature, temperature shock and corrosive media if use is made of strain gauges disposed on the outside of the plate. If piezoelectric sensors are disposed inside the damming body, they are mechanically so connected thereto that the entire measurement sensor has only limited resistance to temperature and temperature shock.

SUMMARY OF INVENTION

It is therefore an object of the invention to provide a measurement sensor for a vortex flowmeter which is more reliable in operation.

This problem is solved by a measurement sensor for a vortex flowmeter having a damming member, a scanning element disposed downstream of the damming member, and an electromechanical transducer associated with the scanning element and embedded therein, in which a deformable compensating layer is provided at least in portions between the electromechanical transducer and the scanning element.

Since a deformable compensating layer is provided at least in portions between the electromechanical transducer and the scanning element, a temperature resistance up to approximately 700° C. and also a temperature shock resistance up to approximately 100° C./sec can be achieved with the measurement sensor according to the invention. The intermediate layer can absorb the arising mechanical stressing due to different coefficients. An intermediate layer comprising a glass silk laminate is of particular advantage with respect to this point.

Advantageous scanning properties are obtained if the electromechanical transducer of the measurement sensor comprises a piezoelectric element.

Particularly advantageously the piezoelectric element comprises a lithium niobate monocrystal, since for the intended application such a piezoelement has the total most favorable properties, possessing more particularly the aforementioned temperature resistance and good electric properties.

Under the conditions aimed at, the piezoelectric element can reliably obtain contact via an electrically conductive adhesive. Advantageously provided between the piezoelectric element and the adhesive is a diffusion barrier which prevents the diffusion of metal atoms into the crystalline structure of the piezoelectric element at the high temperatures aimed at.

A very robust construction is obtained if the scanning element is made up of two strip-like zones enclosing a cavity therebetween. The strip-like zones can! be, for example, corrosion-resistant sheets which are welded to one another, the piezoelectric element being inserted therebetween. The scanning element made up of the strip-like zones is then advantageously also connected gas-tight, more particularly welded to the damming member, so that the interior of the measurement sensor is given the most satisfactory medium insulation with respect to the hot and possibly corrosive medium.

Lastly, advantageously the piezoelectric element is disposed in a cavity bounded by the damming member and the scanning element and is mechanically fixed by means of a non-conductive sealing compound.

BRIEF FIGURE DESCRIPTION

An embodiment of a measurement sensor according to the invention is illustrated in the drawings, which show:

FIG. 1 a perspective view of a measurement sensor according to the invention,

FIG. 2 a cross-sectional view from above of the measurement sensor shown in FIG. 1, FIG. 3 a side cross-sectional view of the measurement sensor shown in FIG. 1, and FIG. 4 the piezoelectric element of the measurement sensor shown in FIGS. 1 to 3, to an enlarged scale.

DETAILED DESCRIPTION

Figure 1:
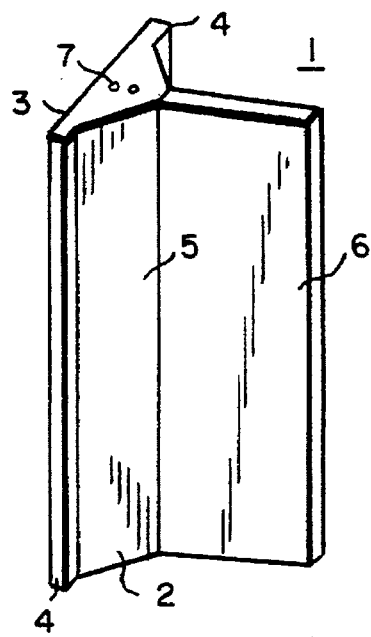

FIG. 1 shows a measurement sensor 1 for a vortex flowmeter. The flowmeter comprises a damming member 2 having an upstream end face 3, two medium detachment edges 4 and a rearward portion 5 which terminates in a roof shape and on whose downstream side a scanning plate 6 is disposed.

Provided on the top side of the damming member, as shown in FIG. 1, are two electric connections 7 via which the signal of measurement sensor is delivered from said sensor.

Figure 2:
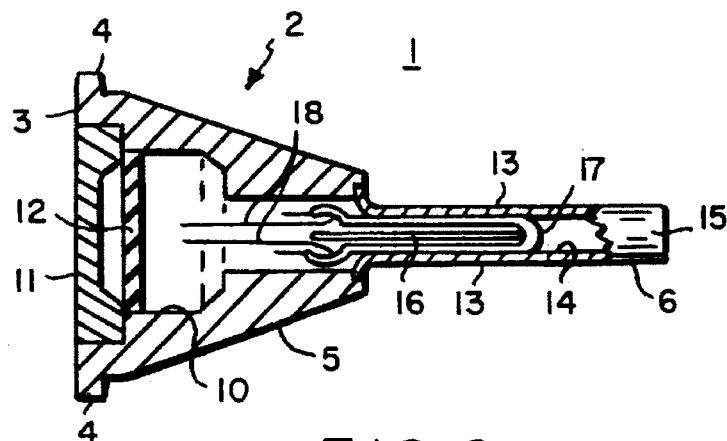

FIG. 2 is a cross-sectional view from above of the measurement sensor shown in FIG. 1, the section extending substantially at half the height of the measurement sensor in FIG. 1.

The damming member 2 contains a cavity 10 which is closed by a closure plug in the direction of the end face 3 of the damming member 2. An insulating plate 12 is disposed on the side of the cavity 10 adjacent the closure plug 11. At the downstream end of the cavity 10 the damming member 2 is open in the direction of the scanning plate 6. The scanning plate 6 is made up of two strip-like zones 13 enclosing between themselves an internal space 14 limited in the outward direction by marginal zones 15. The internal space 14 of the scanning element 6 and the cavity 10 of the damming member 2 are interconnected. In the zone of the downstream side of the damming member the scanning element 6 is connected gas-tight thereto.

A piezoelectric elementa 16 taking the form of a plate-shaped lithium niobate monocrystal is so disposed in the internal space of the measurement sensor that approximately ¾ of the length of the crystal lies inside the scanning element 6 parallel with its flat sides 13. The piezoelectric element 16 is enclosed by a deformable compensating layer 17 comprising a glass silk laminate. Disposed on both sides on the upstream side of the piezoelectric element 16 are electric connections 18 which extend to the electric connections shown in FIG. 1. The connections 18 are fixed to the crystal using a electrically conductive ceramic adhesive.

Figure 3:
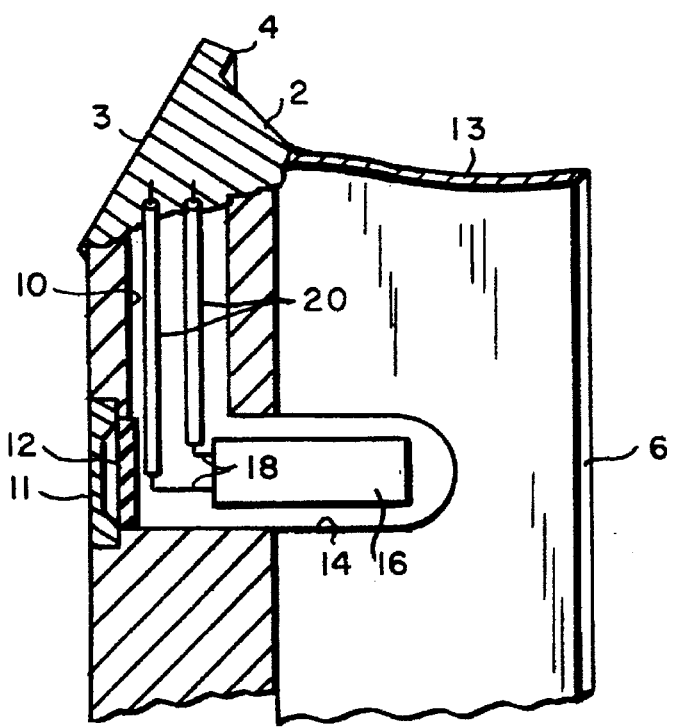

FIG. 3 is a cross-section through the measurement sensor shown in FIG. 1 in side elevation, the plane of the section extending centrally and parallel With the flat sides 13 of the scanning element 6. Correspondingly to FIG. 2, the piezoelement 16 is disposed parallel with/the scanning element 6 in the zone of a recess from which the element extends by about ¼ of its total length into the damming member 2. The insulating disc 12 and the closure plug 11 lie in the direction of the piezoelement 16 at the end face of the damming member 2, where they close the interior space 10 of the damming member 2. The opening in the end face 3 of the damming member 2, closed by the closure plug 11, is needed to enable the piezoelement 16 to be introduced into the measurement sensor. FIG. 3 also shows the electric connections 18 which extend, protected by protective sleeves 20, in a channel in the interior of the damming member 2 to the electric connections 7 on the top side of the damming member.

To produce the measurement sensor 1, preferably high grade steel sheets are welded to one,another in the zone of the scanning plate 6, a recess 14 being provided between the two high grade steel sheets. This plate-shaped arrangement is then welded to an also high grade steel damming member 2, so that the scanning plate 6 is closed gas-tight along is periphery and in the zone of the place where it is connected to the damming member 2. The piezoelectric element is then inserted into the damming member 2, more precisely into its internal space accessible from the end non-conductive ceramic sealing compound.

Figure 4:
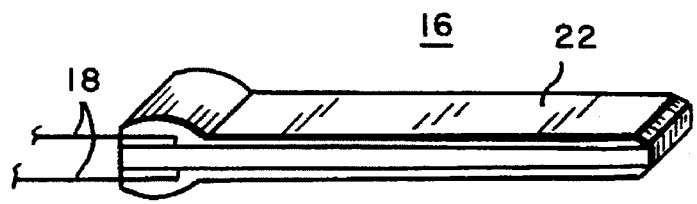

The piezoelement 16 itself is shown in greater detail in FIG. 4. The plate-shaped lithium niobate monocrystal is coated with a conductive ceramic compound 22 on both its flat sides, which in the incorporated position are disposed parallel with the flat sides of the scanning element 6. The conductive ceramic compound 22 is applied more thickly at one end of the crystal, the electric connections 18 being glued on in the thickened zone. For the adhesive connection of the electric connections 18 use is made of the same conductive ceramic compound 22 which is also used for coating the crystal. Provided between the ceramic compound 22 and the lithium niobate monocrystal is a diffusion barrier (not shown in the drawings). The diffusion barrier is extraordinarily thin and preferably consists of an electrically conductive precious metal.

In practice the measurement sensor according to the invention is used as follows:

The intention is to determine as precisely as possible the flow velocity of any particular medium. Examples of possible applications are, for example, the measurement of volumes of gas, but also the determination of the quantities of heat supplied from central or district heating plants on the basis of the quantities of water sampled.

In order to determine the flow velocity, the measurement sensor is disposed in a flow pipe so that the direction of flow extends perpendicular to its end face 3. The scanning plate 6 lies in the direction of flow downstream of the damming member 2 and with its flat sides parallel with the entering, uncontrolled flow. Then, due to the aerodynamic or hydrodynamic effect of the damming member 2, a vortex periodically forms alternatingly in the zone of the medium detachment edges 4. The vortices then run downstream as a Karman vortex trail, act on the scanning element 6 with a change in pressure from one side and the Other and again unit downstream of the measurement sensor 1 to form a total flow. The pressure fluctuations acting periodically on the scanning plate 6 lead to a resilient deformation of the scanning plate 6 which is propagated to the piezoelement 16 embedded in the interior. During deformation, the piezoelement 16 delivers electric pulses to the connections 18 contacted by the piezoelement which can be converted by suitable electronic means (not shown) into a flow velocity and subsequently into a volumetric flow. The vortices periodically passing the scanning element in this way generate for a particular medium and a particular flow velocity characteristic alternating voltage signals which can be evaluated by any desired measuring technique. Vortex flowmeters as illustrated attain a very high accuracy and some embodiments can be calibrated precisely.

The advantages according to the invention, namely temperature strength up to 700° C. and temperature shock strength up to 100° C./sec are mainly achieved by the construction described as a result of the fact that a piezocrystal is in the first place coated with an electrically conductive ceramic coating, then enclosed with a thin compensating layer 17 of a glass silk laminate and embedded in the internal space 10, 14 of the damming member 2 and the scanning element 6 respectively by means of a non-conductive ceramic sealing compound. The piezomonocrystal, which is mechanically sensitive per se, is protected by the compensating layer 17 against mechanical stressings which may occur with extreme temperature gradients due to different coefficients of thermal expansion of the materials used.

The compensating layer between the conductive ceramic coating and the ceramic embedding is effective, since mechanical stressings due to the effects of temperature are more particularly operative in the direction of the particular greatest extent of the constructional elements used—i.e., in this example in the direction of the longitudinal extension of the piezoelement 16. At this place the compensating layer can offer a certain clearance in a direction parallel with the flat sides of the piezoelement 16 and the scanning plate 6. In the direction decisive for the scanning properties—i.e., perpendicularly to the flat sides 13 of the scanning plate 6—the piezomonocrystal is particularly thin and consequently hardly changes the geometrical dimensions with changes in temperature. In this direction the compensating layer need not be very effective, so that it can be kept quite thin in the perpendicular direction. A thin compensating layer 17 in this direction is however helpful for the mechanical coupling of the piezoelement 16 to the scanning plate 6.

While the compensating layer 17 is in itself advantageous for the resistance of the piezoelement 16 to high temperature gradients, the whole choice of materials used in the preferred embodiment has advantages for temperature resistance. For example, the measurement sensor described, with its materials high grade steel, ceramic sealing compound, ceramic conductive adhesive and glass silk laminate is not destroyed up to at least 700° C., although its functionality terminates at approximately 400° C. It is moreover helpful for the long-term stability of the lithium niobate monocrystal if a diffusion barrier of a precious metal is disposed between the monocrystal and the electrically conductive adhesive, so as to prevent any diffusion of metal atoms from the adhesive into the crystal even with fairly long-lasting high temperature loading. Otherwise, sooner or later the piezoelement changes its conductivity.

What is claimed is:

1. A high-temperature-tolerant measurement sensor for a vortex flowmeter having a damming member (2), a scanning element (6) disposed downstream of the damming member (2), a piezoelectric transducer (1) associated with the scanning element (6) and embedded therein, and a deformable compensating; layer (17) provided, at least in portions, between the piezoelectric transducer and the scanning element, wherein, in order to provide temperature resistance up to at least about 400° C., the compensating layer is a glass silk laminate.

2. A high-temperature-tolerant measurement sensor for a vortex flowmeter having a damming member (2), a scanning element (6) disposed downstream of the damming member, an electromechanical transducer (16) associated with the scanning element and embedded therein, and a deformable compensating layer (17) provided at least in portions between the electromechanical transducer (16) and the scanning element (6), wherein, in order to provide temperature resistance up to at least about 400° C., the compensating layer is a glass silk laminate.

3. A high-temperature-tolerant measurement sensor for a vortex flowmeter having a damming member (2), a scanning element (6) disposed downstream of the damming member (2), a piezoelectric transducer (16) mounted inside the scanning element (6), and wherein, in order to compensate for differing coefficients of thermal expansion and to provide resistance to temperature shock, a glass silk laminate (17) is provided, at least in portions, between the piezoelectric transducer (16) and the scanning element (6), to serve as a deformable compensating layer.

4. A measurement sensor according to claim 1, wherein the piezoelectric transducer comprises a lithium niobate monocrystal.

5. A measurement sensor according to claim 1, wherein the piezoelectric transducer is substantially disposed in the interior of the scanning element.

6. A measurement sensor according to claim 1, characterized in that the piezoelectric element contacts electric wires via an electrically conductive adhesive.

7. A measurement sensor according to claim 1, characterized in that a diffusion barrier is provided between the piezoelectric element and the adhesive.

8. A measurement sensor according to claim 1, characterized in that the scanning element is made up of two strip-like zones enclosing a cavity therebetween.

9. A measurement sensor according to claim 1, wherein the scanning element is connected gas-tightly to the damming element (2).

10. A measurement sensor according to claim 1, wherein the piezoelectric transducer is disposed in a cavity bounded by the damming member and the scanning element and is mechanically secured by means of non-conductive sealing compound.

11. A measurement sensor according to claim 3, wherein the piezoelectric transducer comprises a lithium niobate monocrystal.

* * * * *